United States Patent
Lee et al.

(10) Patent No.: US 9,574,549 B2
(45) Date of Patent: Feb. 21, 2017

(54) BLADE MAINTENANCE DEVICE FOR WIND TURBINE

(75) Inventors: Byung Kyu Lee, Geoje-si (KR); Hong Gyeoum Kim, Daedeok-gu (KR); Jong Hwan Lee, Yuseong-gu (KR); Young Seok Cho, Yuseong-gu (KR); Young Youl Ha, Gangnam-gu (KR); In Chul Ha, Geoje-si (KR); Dong Ki Han, Gwangmyeong-si (KR)

(73) Assignee: Samsung Heavy Ind. Co., Ltd., Seoul (KR)

( * ) Notice: Subject to any disclaimer, the term of this patent is extended or adjusted under 35 U.S.C. 154(b) by 172 days.

(21) Appl. No.: 14/342,364

(22) PCT Filed: Aug. 22, 2012

(86) PCT No.: PCT/KR2012/006649
§ 371 (c)(1),
(2), (4) Date: Feb. 5, 2015

(87) PCT Pub. No.: WO2013/032166
PCT Pub. Date: Mar. 7, 2013

(65) Prior Publication Data
US 2015/0135459 A1  May 21, 2015

(30) Foreign Application Priority Data

Sep. 2, 2011  (KR) .................. 10-2011-0088777
Sep. 2, 2011  (KR) .................. 10-2011-0088927

(51) Int. Cl.
*F03D 11/00* (2006.01)
*F03D 1/00* (2006.01)
(Continued)

(52) U.S. Cl.
CPC .......... *F03D 11/0016* (2013.01); *B08B 1/002* (2013.01); *B08B 1/04* (2013.01); *B08B 3/024* (2013.01);
(Continued)

(58) Field of Classification Search
CPC .......... F03D 1/003; F03D 80/55; F03D 80/40; B05B 13/0436; B08B 1/02; B08B 3/022
See application file for complete search history.

(56) References Cited

U.S. PATENT DOCUMENTS

2006/0018752 A1*  1/2006  LeMieux ................ F01D 11/00
                                              416/96 R
2009/0169734 A1   7/2009  Teichert
(Continued)

FOREIGN PATENT DOCUMENTS

EP     1 517 033       3/2005
JP     2002-115646     4/2002
(Continued)

OTHER PUBLICATIONS

Extended European Search Report dated Apr. 16, 2015 for European Patent Application No. 12828362.9.
(Continued)

*Primary Examiner* — Shay Karls
(74) *Attorney, Agent, or Firm* — Ladas & Parry, LLP

(57) ABSTRACT

Provided is a blade maintenance device for a wind turbine. The blade maintenance device for the wind turbine includes: a body that travels along a leading edge of a blade; support units that extend from the body to both sides of the blade and support the sides of the blade; and a maintenance unit installed at at least one of the body and the support units so as to perform maintenance of an outer side of the blade.

18 Claims, 13 Drawing Sheets

(51) Int. Cl.
  *B08B 1/00* (2006.01)
  *B08B 1/04* (2006.01)
  *B08B 3/02* (2006.01)
  *B08B 5/02* (2006.01)
  *B08B 7/04* (2006.01)
(52) U.S. Cl.
  CPC . *B08B 5/02* (2013.01); *B08B 7/04* (2013.01); *F03D 1/003* (2013.01); *F03D 17/00* (2016.05); *F03D 80/40* (2016.05); *F03D 80/55* (2016.05); *Y02E 10/722* (2013.01); *Y10S 901/01* (2013.01); *Y10S 901/41* (2013.01); *Y10S 901/44* (2013.01); *Y10S 901/47* (2013.01)

(56) References Cited

U.S. PATENT DOCUMENTS

2010/0132137 A1* 6/2010 Eggleston ................ B08B 1/02
                                                    15/21.1
2010/0132738 A1   6/2010 Kumar

FOREIGN PATENT DOCUMENTS

| JP | 2004-37210   | 2/2004  |
| JP | 2008-309098 A | 12/2008 |
| WO | 2011/107087  | 9/2011  |

OTHER PUBLICATIONS

International Search Report for PCT/KR2012/006649 mailed on Feb. 1, 2013 and in its English Translation.

\* cited by examiner

BLADE MAINTENANCE DEVICE FOR WIND TURBINE

CROSS-REFERENCE TO RELATED APPLICATIONS

This application is the U.S. National Stage of International Patent Application No. PCT/KR2012/006649 filed on Aug. 22, 2012, which claims priority to Korean Patent Application No. 10-2011-0088777 filed on Sep. 2, 2011 and Korean Patent Application No. 10-2011-0088927 filed on Sep. 2, 2011, the disclosures of which are hereby incorporated by reference in their entireties.

TECHNICAL FIELD

The present invention relates to a blade maintenance device for a wind turbine, and more particularly, to a blade maintenance device for a wind turbine that is capable of performing maintenance, such as cleaning, inspection, and deicing of a blade while travelling along an outer side of the blade.

BACKGROUND ART

A wind turbine is a device that produces electricity by converting wind energy into mechanical energy and comes into the spotlight as a clean energy source for reducing a greenhouse gas. A conventional wind turbine includes a tower, a nacelle mounted on an upper part of the tower, and a rotor connected to the nacelle and having a plurality of blades.

In the wind turbine, periodic maintenance, such as cleaning, inspection, and deicing (to remove ice formed on a blade), is required even after installation so as to prevent a trouble or an accident and to improve operating efficiency. However, since the wind turbine is a large structure having a height of the tower of about 100 meters and a length of the blade of 40 to 70 meters or more, there are many difficulties in performing maintenance. In particular, since the blade is placed at a high altitude, a working environment is poor and dangerous, as a worker needs to stay in the midair for maintenance.

Since a maintenance condition of the blade is poor in this way, a device that is capable of performing maintenance without the worker's direct access to the blade has been suggested.

Japanese Patent Laid-open Publication No. 2002-115646 discloses a cleaning device that performs cleaning of a leading edge while moving along the leading edge of a blade. The device is equipped with a brush that moves along the leading edge of the blade and a driving instrument installed in the blade so that the brush can be moved, and including a motor, a gear, and a car wheel.

However, since, in the device, the driving instrument needs to be installed in the blade, a movement space of the driving instrument needs to be formed within the blade. Also, since slits need to be formed in the leading edge of the blade so as to connect the driving instrument inside the blade and the brush disposed at an outer side of the leading edge, rigidity of the blade may be degraded. A cleaning area is limited to the leading edge of the blade, and it is difficult to remove ice formed on the leading edge of the blade.

U.S. Patent Application Publication No. 2010/0132137 discloses a device that is capable of performing inspection and cleaning of a blade while travelling along an outer side of a leading edge of the blade. The device is equipped with a travelling body having a plurality of wheels for travelling along the leading edge, a driving unit for rotating the plurality of wheels, units for cleaning and inspection, and wing parts that extend to both lower sides of the travelling body so as to travel along the leading edge while keeping balance.

However, since the device keeps balance only by the wing parts that extend to both sides of the travelling body, it is difficult for the travelling body to stably travel along the leading edge. Areas to be cleaned and inspected are limited to the leading edge of the blade.

PRIOR-ART DOCUMENT

Patent Document

Patent Document 1: Japanese Patent Laid-open Publication No. 2002-115646 (published on Apr. 19, 2002)
Patent Document 2: U.S. Patent Application Publication No. 2010/0132137 (published on Jun. 3, 2010)

DISCLOSURE

Technical Problem

The present invention is directed to providing a blade maintenance device for a wind turbine that is capable of performing maintenance of a blade while stably travelling along the blade.

The present invention is also directed to providing a blade maintenance device for a wind turbine that is capable of performing maintenance with respect to most areas of an outer side of a blade.

The present invention is also directed to providing a blade maintenance device for a wind turbine that is capable of easily removing ice formed on a leading edge of a blade.

Technical Solution

One aspect of the present invention provides a blade maintenance device for a wind turbine including: a body that travels along a leading edge of a blade; support units that extend from the body to both sides of the blade and support the sides of the blade; and a maintenance unit installed at at least one of the body and the support units so as to perform maintenance of an outer side of the blade.

The body may include a plurality of wheels installed to contact the blade leading edge, a driving motor that drives at least one of the plurality of wheels, a controller for controlling operations of the driving motor and the maintenance unit, and a battery unit installed so as to supply voltages for an operation of the blade maintenance device.

The support units may include support robot arms installed at both sides of the body.

Each of the support robot arms may include a roller that contacts an outer side of the blade and may be installed at a distal end of the support robot arm so as to make a rolling movement.

Each of the support robot arms may further include a shoulder part coupled to the sides of the body and a plurality of arm parts that are rotatably connected to each other via a plurality of rotation joint parts.

Each of the support robot arms may further include a sensor that detects a separation distance between the distal end of the support robot arm and the sides of the blade.

The maintenance unit may include a cleaning brush that is rotatably installed at a lower part of the body so as to clean the blade leading edge, a motor installed at the body so as to drive the cleaning brush, a cleaning solution tank installed at the body, and a cleaning solution supply unit that supplies a cleaning solution of the cleaning solution tank to the cleaning brush.

The maintenance unit may further include a cleaning solution supply flow path provided on a rotation shaft of the motor to which the cleaning brush is coupled, so as to supply the cleaning solution to a center of the cleaning brush, a cleaning solution guide member that is installed at an outer side of the rotation shaft and surrounds an inlet of the cleaning solution supply flow path so as to guide the cleaning solution toward the rotating cleaning solution supply flow path, and a cleaning solution supply pipe that guides the cleaning solution of the cleaning solution tank toward the cleaning solution guide member.

The maintenance unit may include a deicing unit for removing ice formed on the blade leading edge, and the deicing unit may include a blower flow path provided on the body and having an outlet facing the blade leading edge, a blower fan installed within the blower flow path so as to blow air toward the outlet of the blower flow path, a motor that drives the blower fan, and a heater installed within the blower flow path so as to heat air of the blower flow path.

The maintenance unit may include cleaning robot arms installed at both sides of the body and a cleaning brush installed at a distal end of each of the cleaning robot arms.

Each of the cleaning robot arms may include a shoulder part coupled to the sides of the body and a plurality of arm parts that are rotatably connected to each other via a plurality of rotation joint parts.

Each of the cleaning robot arms may further include a sensor that detects a separation distance between the distal end of each cleaning robot arm and the sides of the blade.

The maintenance unit may include a motor installed at each of the cleaning robot arms so as to drive the cleaning brush, a cleaning solution tank installed at the body, and a cleaning solution supply unit that supplies a cleaning solution of the cleaning solution tank to the cleaning brush.

The maintenance unit may include inspection robot arms installed at both sides of the body and an inspection unit that is installed at a distal end of each of the inspection robot arms so as to inspect defects of the sides of the blade and implemented as at least one of a camera and an ultrasonic inspection unit.

Each of the inspection robot arms may further include a shoulder part coupled to the sides of the body and a plurality of arm parts that are rotatably connected to each other via a plurality of rotation joint parts.

The maintenance unit may include an inspection unit that is installed at the body so as to inspect defects of the blade leading edge and implemented as at least one of a camera and an ultrasonic inspection unit.

The body may include a first sensor that detects a position of a free end of the blade and a second sensor that detects a position of an end toward a hub of the blade.

The support units may include support members each having a length that is larger than a maximum width of the blade, bent along each of curved surfaces of both sides of the blade, and formed of a material that is capable of being elastically deformed.

Each of the support members may include a roller that contacts an outer side of the blade and makes a rolling movement.

The roller may be disposed in a position in which the roller is inclined toward a maximum thickness of the blade or toward a trailing edge of the blade from the maximum thickness of the blade.

The blade maintenance device may further include a sensor that detects a separation distance between each of the support members and the sides of the blade.

The support members may be rotatably coupled to the body, and the body may include a plurality of support member driving units that rotate the support members to be spaced apart from the sides of the blade or to be close to the sides of the blade.

Each of the plurality of support member driving units may include a gear part connected to each of the support members, a worm wheel engaged with the gear part, and a motor that rotates the worm wheel in forward and reverse directions.

The maintenance unit may include a cleaning brush that is rotatably installed at a lower part of the body so as to clean the blade leading edge, a motor installed at the body so as to drive the cleaning brush, a cleaning solution tank installed at at least one of the body and the support members, and a cleaning solution supply unit that supplies a cleaning solution of the cleaning solution tank to the cleaning brush.

The maintenance unit may include a movement unit that moves along one of the support members, a cleaning brush that is installed at the movement unit so as to be rotated in contact with the sides of the blade, a motor installed at the movement unit so as to drive the cleaning brush, a cleaning solution tank installed at at least one of the body and the support members, and a cleaning solution supply unit that supplies a cleaning solution of the cleaning solution tank to the cleaning brush.

The maintenance unit may include a movement unit that moves along one of the support members and an inspection unit that is installed at the movement unit so as to inspect defects of the sides of the blade and implemented as at least one of a camera and an ultrasonic inspection unit.

The movement unit may include a movement member that moves along one of the support members, a movement motor installed at the movement member, and a driving body coupled to a shaft of the movement motor in contact with an outer side of the support member.

The movement unit may further include a plurality of rollers installed at the movement member so that the movement member is capable of moving along one of the support members.

The driving body may include an external gear, and each of the support members may include a straight gear part that is long disposed in a lengthwise direction of one of the support members so as to engage with the external gear.

Another aspect of the present invention provides a blade maintenance device for a wind turbine including: a body that travels along a leading edge of a blade; support members that extend from both sides of the body to both lower sides of the blade; and a maintenance unit that moves along the support members and performs maintenance of an outer side of the blade.

The maintenance unit may include at least one of a cleaning unit for cleaning the outer side of the blade and a defect inspection unit for inspecting defects of the outer side of the blade.

Still another aspect of the present invention provides a blade maintenance device for a wind turbine including: a body that travels along a leading edge of a blade; and a deicing unit for removing ice formed on the blade leading edge, wherein the deicing unit may include a blower flow path provided on the body and having an outlet facing the blade leading edge, a blower fan installed within the blower flow path so as to blow air toward the outlet of the blower flow path, a motor that drives the blower fan, and a heater installed within the blower flow path so as to heat air of the blower flow path.

Advantageous Effects

As described above, a blade maintenance device for a wind turbine according to the one or more embodiments of the present invention includes support units that are installed at both sides of a body that travels along a leading edge of a blade and that support sides of the blade, thereby performing maintenance of the blade while stably traveling along the blade.

In addition, a blade maintenance device for a wind turbine according to the one or more embodiments of the present invention includes a cleaning unit that cleans the leading edge of the blade and a cleaning unit that cleans the sides of the blade, thereby easily performing cleaning of all areas of an outer side of the blade.

Moreover, in a blade maintenance device for a wind turbine according to the one or more embodiments of the present invention, a deicing unit supplies hot wind to the leading edge while the blade maintenance device travels along the leading edge of the blade so that ice formed on the leading edge can be easily removed.

Furthermore, in a blade maintenance device for a wind turbine according to the one or more embodiments of the present invention, a defect inspection unit installed at the body inspects defects of the leading edge of the blade while the body travels, and defect inspection units installed at inspection robot arms or support members inspect defects of both sides of the blade while moving upward or downward so that defects of the whole area of the blade can be easily inspected.

MODES OF THE INVENTION

Hereinafter, embodiments of the present invention will be described with reference to the accompanying drawings in detail.

Figure 1:
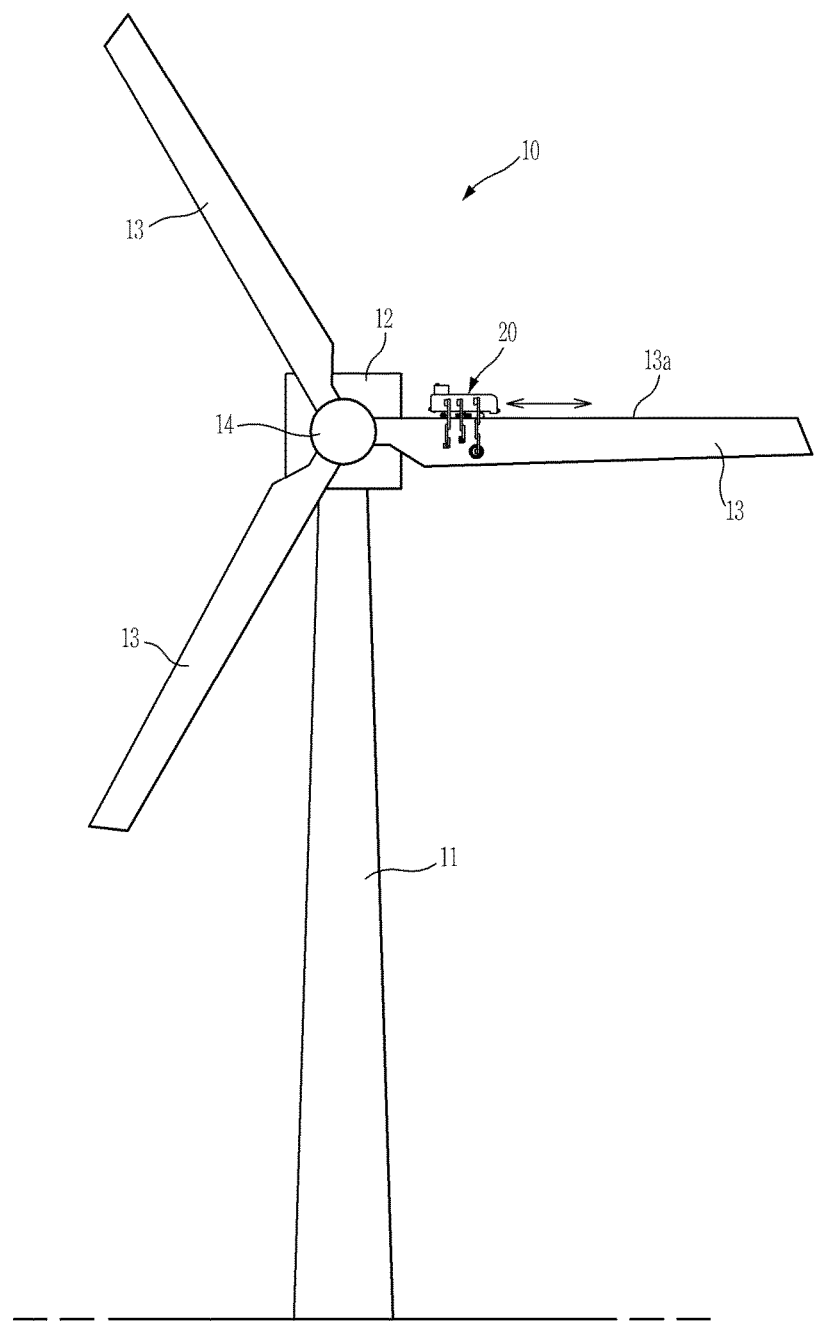
FIG. 1 is a front view of a wind turbine on which a blade maintenance device is mounted, according to a first embodiment of the present invention.

FIG. 1 is a front view of a wind turbine on which a blade maintenance device for a wind turbine is mounted, according to a first embodiment of the present invention, and FIGS. 2 through 6 illustrate the blade maintenance device illustrated in FIG. 1.

As illustrated in FIG. 1, a wind turbine 10 includes a tower 11, a nacelle 12 installed at a top end of the tower 11, and a plurality of blades 13 installed at the nacelle 12. The plurality of blades 13 are installed in a radial form at a hub 14 that is rotatably installed at the nacelle 12. The blades 13 are rotated by wind, thereby rotating the hub 14, and the hub 14 rotates a generator (not shown) installed inside the nacelle 12 so as to generate electricity.

When the wind turbine 10 operates, foreign substances, such as dust or worms, may be attached to surfaces of the blades 13 and thus, the surfaces of the blades 13 may be contaminated. Icing may occur on a leading edge 13a of each blade 13 in winter. Also, cracks or scratches may occur in a surface of each blade 13 during usage. Foreign substances or ice on the surface of the blade 13 may cause degrading of efficiency of the wind turbine 10, and when defects of the surface of the blade 13 are left alone, this may cause a damage of the blade 13. Thus, it is necessary to remove foreign substances on or to inspect defects in the surface of the blade 13 through periodic maintenance.

A blade maintenance device 20 according to the first embodiment of the present invention is a device that performs maintenance, such as cleaning, inspection, and deicing, of an outer side of the blade 13 while travelling along the blade 13 in a state in which the blade maintenance device 20 is mounted on the outer side of the blade 13, as illustrated in FIG. 1. When maintenance of the blade 13 is performed, like in the example of FIG. 1, the blade 13 is maintained approximately horizontally, and a pitch of the blade 13 is adjusted so that the blade leading edge 13a faces upward, and then, the blade maintenance device 20 is mounted on the blade 13.

Figure 2:
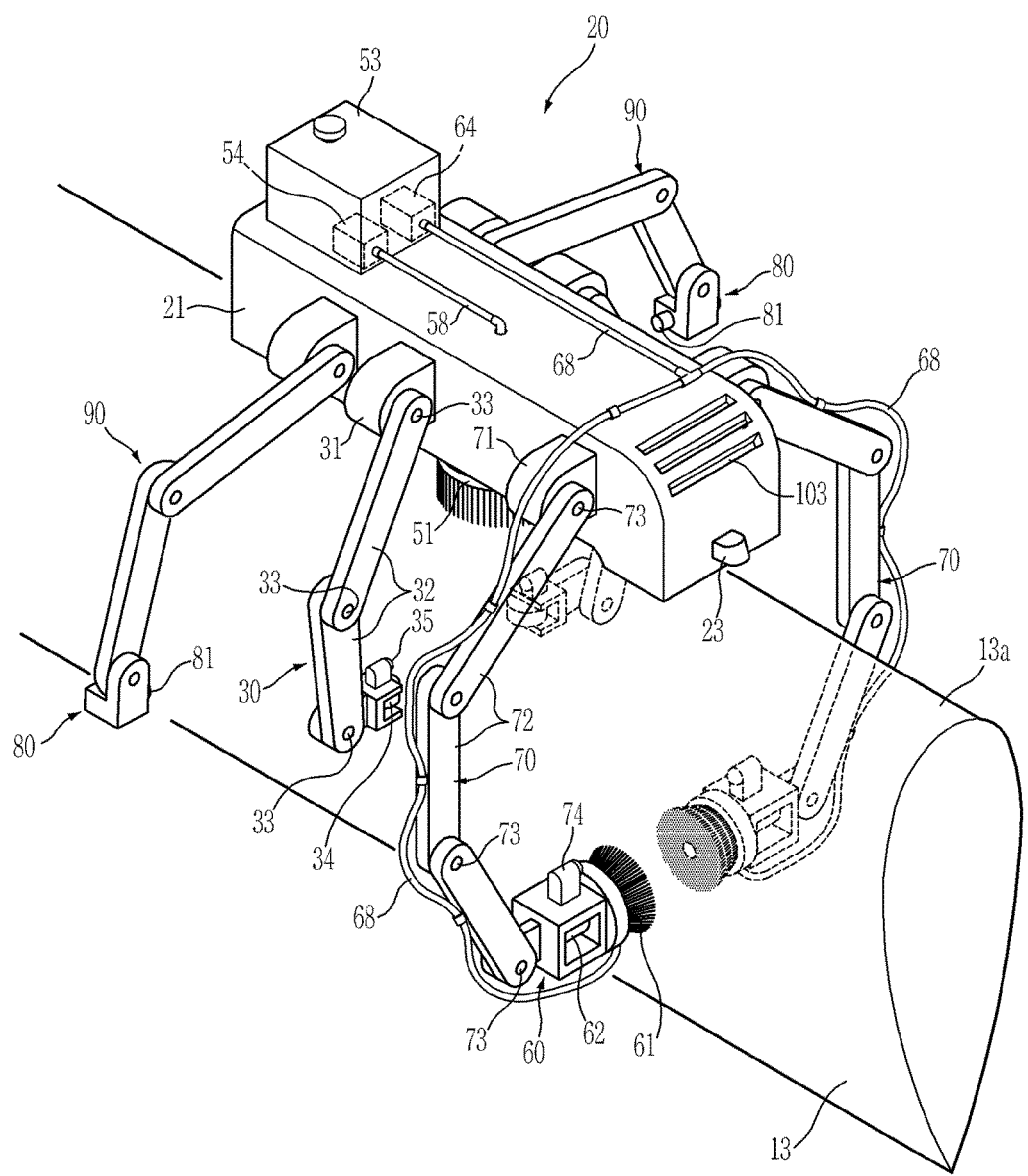
FIG. 2 is a perspective view of the blade maintenance device according to the first second embodiment of the present invention, mounted on a wind turbine blade.
Figure 3:
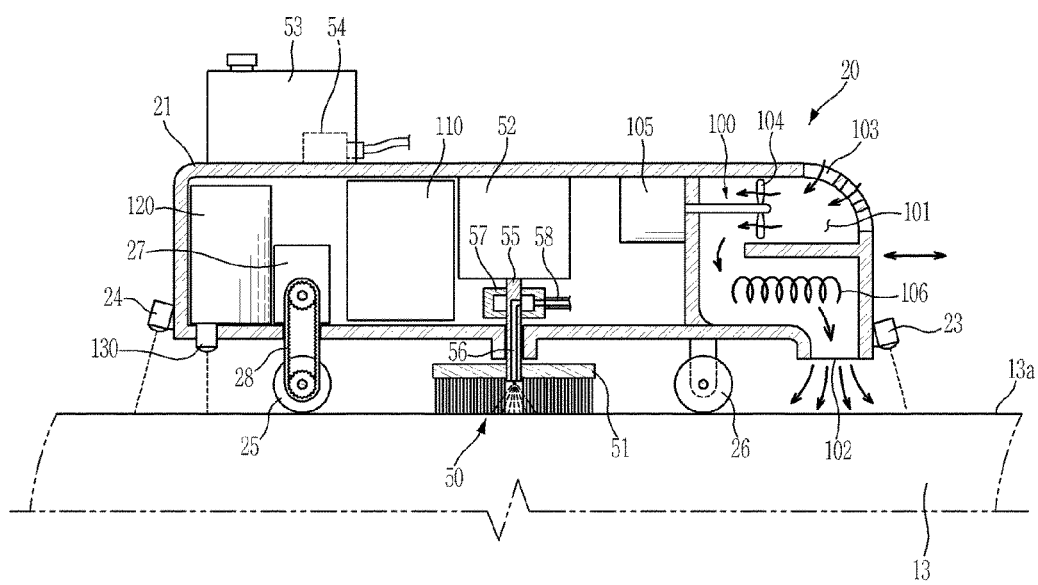
FIG. 3 is a cross-sectional view of a body of the blade maintenance device according to the first second embodiment of the present invention.

As illustrated in FIGS. 2 and 3, the blade maintenance device 20 according to the first embodiment of the present invention includes a body 21 that travels along the blade leading edge 13a, one or more maintenance units installed at the body 21 so as to perform maintenance of the blade 13, and support units that are installed at both sides of the body 21 and support sides of the blade 13 so that the body 21 can be supported and stably travelled.

A plurality of wheels 25 and 26 are installed at a lower part of the body 21 so that the body 21 can travel along the blade leading edge 13a, and a driving motor 27 is installed in the body 21 so as to drive one of the plurality of wheels 25 and 26, as illustrated in FIG. 3. The driving motor 27 and the wheel 25 may be connected to each other via a connection unit 28, such as a belt or chain, so that rotational force of the driving motor 27 can be transferred to the body 21 via the wheel 25. Here, one wheel 25 of the plurality of wheels 25 and 26 and the driving motor 27 are connected to each other. However, the driving motor 27 may also be connected to each of the plurality of wheels 25 and 26.

Each of the wheels 25 and 26 may be provided using a material having a high frictional force, such as rubber, so that each of the wheels 25 and 26 does not slide from the blade leading edge 13a. The driving motor may be employed to be forwardly (clockwise) and reversely (counterclockwise) rotated so as to make a forward movement and a backward movement of the body 21. In the first embodiment, the driving motor 27 and the plurality of wheels 25 and 26 are employed as units that allow travelling of the body 21. However, the driving motor 27 and the plurality of wheels 25 and 26 may also be replaced with caterpillar travelling units installed at the lower part of the body 21. The body 21 may include a first sensor 23 that is installed in front of the body 21 and detects a position of a free end of the blade 13, and a second sensor 24 that is installed in rear of the body 21 and detects a position of an end toward the hub 14 of the blade 13. Thus, the body 21 may recognize positions of both ends of the blade 13 using the first and second sensors 23 and 24 when the body 21 travels along the blade leading edge 13a.

Figure 4:
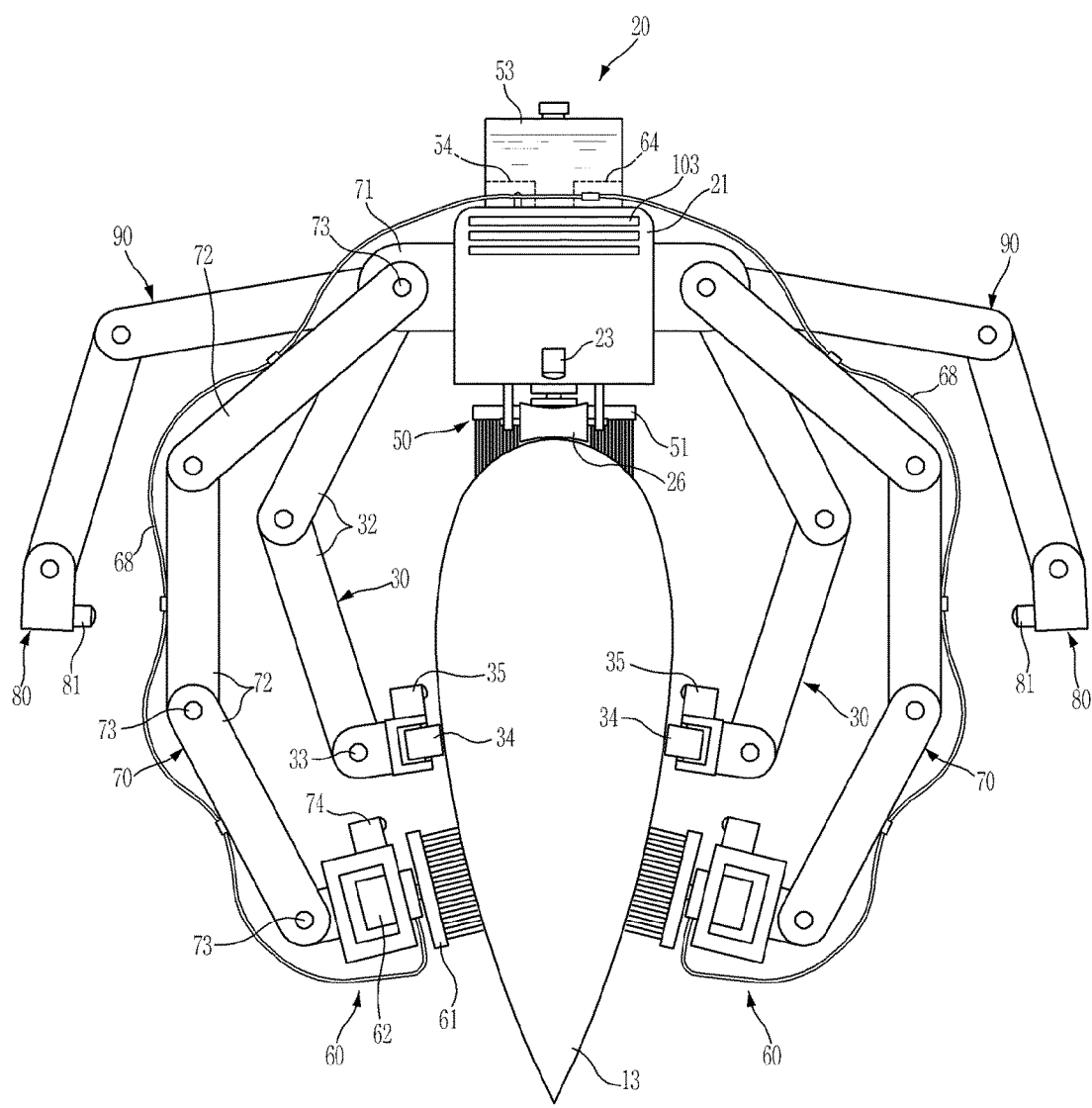
FIG. 4 is a front view of the blade maintenance device according to the first second embodiment of the present invention.

As illustrated in FIGS. 2 and 4, the support units that support the sides of the blade 13 for stable travelling of the body 21 may include support robot arms 30 that are installed at both sides of the body 21. Each of the support robot arms 30 includes a shoulder part 31 coupled to the sides of the body 21, a plurality of arm parts 32 that are rotatably connected to each other via a plurality of rotation joint parts 33, and a roller 34 that is in contact with the outer side of the blade 13 and installed at a distal end of each support robot arm 30 so as to make a rolling movement. Although not shown, a driving unit, such as a servo motor, may be installed at the shoulder part 31, the arm parts 32, or the rotation joint parts 33 that connect the arm parts so that the support robot arms 30 can perform a rotation operation, like in conventional robot arms.

Each support robot arm 30 supports the body 21 when the roller 34 installed at the distal end of the support robot arm 30 is adjacent to the sides of the blade 13 and makes a rolling movement so that the body 21 can be stably travelled. Also, since each support robot arm 30 moves freely and can easily change a position of the roller 34, even when the thickness of the blade 13 varies while the body 21 travels, the roller 34 may be maintained in a state in which the roller 34 always contacts the outer side of the blade 13. For this operation, a sensor 35 that detects a separation distance between the distal end of each support robot arm 30 and the sides of the blade 13 may be installed at each support robot arm 30. The sensor 35 is installed to control an operation of each support robot arm 30 through detection of the sensor 35.

Also, the blade maintenance device 20 according to the first embodiment of the present invention includes a maintenance unit having various shapes for maintenance of the blade 13. As illustrated in FIGS. 2 and 3, the maintenance unit may include a first cleaning unit 50 for cleaning the blade leading edge 13a, a second cleaning unit 60 for cleaning both sides of the blade 13, first defect inspection units 80 and a second defect inspection unit 130 for inspecting defects of the blade 13, and a deicing unit 100 for removing ice formed on the blade leading edge 13a.

In addition, the blade maintenance device 20 includes a controller 110 installed within the body 21 so that the blade maintenance device 20 can be travelled and an operation of the blade maintenance device 20 can be controlled, and a battery unit 120 installed within the body 21 so as to supply voltages for the operation of the blade maintenance device 20. Also, although not shown, a wireless communication unit that may communicate with a remote control system so as to remotely control the blade maintenance device 20, and a manipulation unit through which a user himself/herself may input information regarding an operation of the blade maintenance device 20 may be disposed on the body 21.

Figure 6:
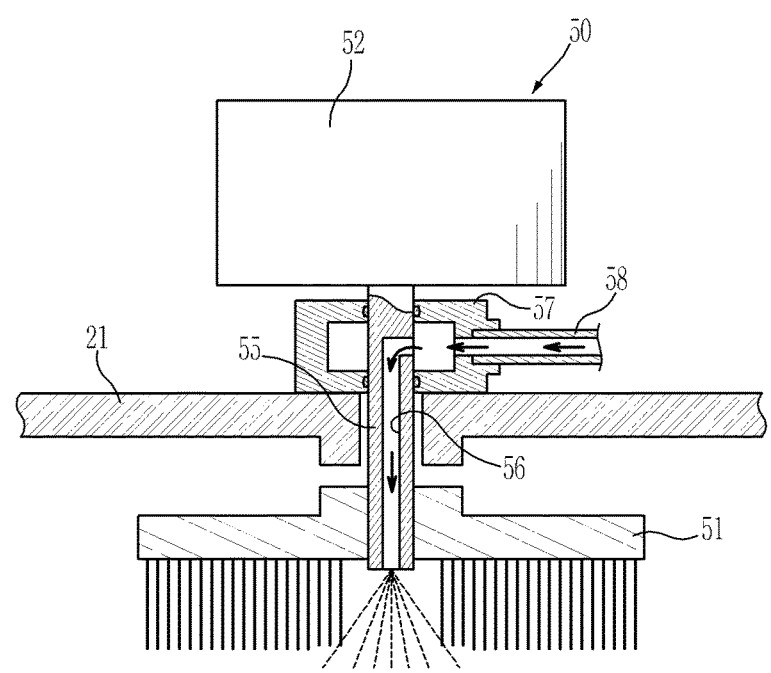
FIG. 6 is a cross-sectional view of main parts of a first cleaning unit of the blade maintenance device according to the first second embodiment of the present invention.

The first cleaning unit 50 includes a first cleaning brush 51 that is rotatably installed at a lower part of the body 21, a motor 52 installed in the body 21 so as to drive the first cleaning brush 51, a cleaning solution tank 53 installed at an upper part of the body 21, and a cleaning solution supply unit 54 installed within the cleaning solution tank 53 so as to supply a cleaning solution of the cleaning solution tank 53 to the first cleaning brush 51, as illustrated in FIGS. 3 and 6.

As illustrated in FIG. 6, a cleaning solution supply flow path 56 is formed on a rotation shaft 55 of the motor 52 to which the first cleaning brush 51 is coupled, so as to supply the cleaning solution to a center of the first cleaning brush 51. A ring-shaped cleaning solution guide member 57 is installed at an outer side of the rotation shaft 55 inside the body 21 and surrounds an inlet of the cleaning solution supply flow path 56 so as to guide the cleaning solution toward the rotating cleaning solution supply flow path 56. A cleaning solution supply pipe 58 connected to the cleaning solution tank 53 is connected to the cleaning solution guide member 57. The cleaning solution supply unit 54 inside the cleaning solution tank 53 may be configured as a conventional fluid forced sending pump.

The first cleaning unit 50 may perform cleaning of the blade leading edge 13a by supplying the cleaning solution to the center of the first cleaning brush 51 while the first cleaning brush 51 is rotated due to an operation of the motor 52. Of course, since the operation is performed while the body 21 travels along the blade 13, cleaning may be performed in all areas of the blade leading edge 13a.

Figure 5:
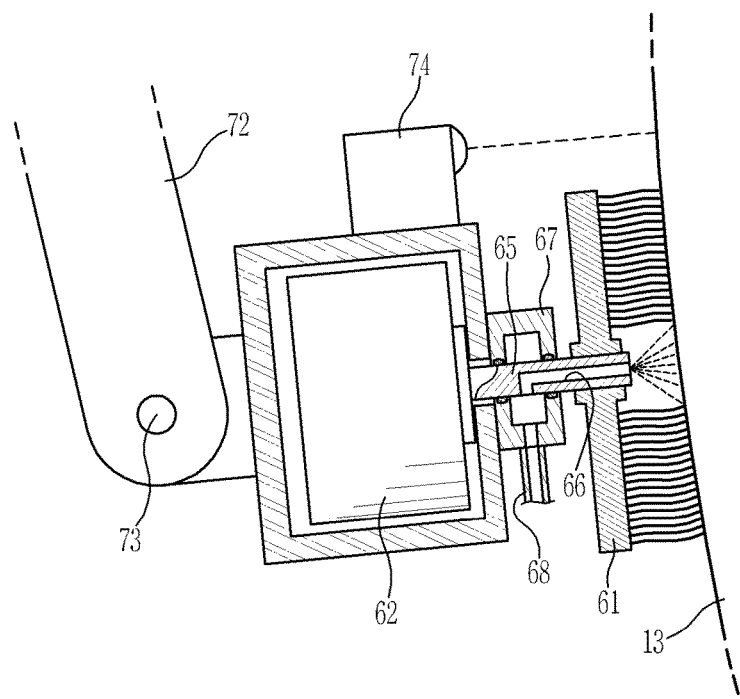
FIG. 5 is a cross-sectional view of main parts of a second cleaning unit of the blade maintenance device according to the first second embodiment of the present invention.

The second cleaning unit 60 includes cleaning robot arms 70 installed at both sides of the body 21, a second cleaning brush 61 installed at a distal end of each of the cleaning robot arms 70, a motor 62 installed at each of the robot arms 70 so as to drive the second cleaning brush 61, and a cleaning solution supply unit 64 installed in the cleaning solution tank 53 so as to supply the cleaning solution of the cleaning solution tank 53 to the second cleaning brush 61, as illustrated in FIGS. 2 and 5.

Each of the cleaning robot arms 70 may include a shoulder part 71, a plurality of arm parts 72, and a plurality of rotation joint parts 73, like in the support robot arms 30. Each cleaning robot arm 70 may further include a sensor 74 that detects a separation distance between the distal end of each cleaning robot arm 70 and the sides of the blade 13, so as to control an operation of each cleaning robot arm 70. Also, the second cleaning unit 60 shares the cleaning solution tank 53 with the first cleaning unit 50; however, the cleaning solution tank 53 may be separately provided for each of the first cleaning unit 50 and the second cleaning unit 60.

Also, the second cleaning unit 60 may include a cleaning solution supply flow path 66 formed on a rotation shaft 65, a cleaning solution guide member 67 installed at an outer side of the rotation shaft 65, and a cleaning solution supply pipe 68 that connects the cleaning solution tank 53 and the cleaning solution guide member 67, as illustrated in FIG. 5, like in the first cleaning unit 50 so that the cleaning solution of the cleaning solution tank 53 can be supplied to a center of the second cleaning brush 61. The cleaning solution supply pipe 68 extends from the cleaning solution tank 53, is diverged toward the cleaning robot arms 70 installed at both sides of the body 21, and each cleaning solution supply pipe 68 is connected to the cleaning solution guide member 67.

The second cleaning unit 60 may move to an upper side or a lower side of the blade 13 due to an operation of each cleaning robot arm 70 in a state in which the second cleaning brush 61 contacts the sides of the blade 13. Simultaneously, the second cleaning brush 61 is rotated by the motor 62, and the cleaning solution is supplied to the second cleaning brush 61 so that cleaning of the sides of the blade 13 can be performed. Also, the cleaning operation is performed together with the operation of the body 21 that travels in a lengthwise direction of the blade 13 so that cleaning can be performed in all areas of the sides of the blade 13. If the first cleaning unit 50 and the second cleaning unit 60 operate together while the body 21 travels, cleaning can be performed in all areas of the outer side of the blade 13.

Here, the second cleaning brush 61 of the second cleaning unit 60 is rotated due to the operation of the motor 62, and the cleaning solution is supplied to the second cleaning brush 61. However, the second cleaning unit 60 may perform cleaning due to an operation in which the cleaning robot arms 70 move upward and downward, in a state in which the second cleaning brush 61 is fixed to the distal end of each cleaning robot arm 70. That is, each cleaning robot arm 70 may operate such that the second cleaning brush 61 is not rotated and moves like brushing.

Each of the first defect inspection units 80 may include inspection robot arms 90 installed at both sides of the body 21, and a camera 81 installed at a distal end of each of the inspection robot arms 90 so as to inspect defects of the sides of the blade 13, as illustrated in FIGS. 2 and 4.

The inspection robot arms 90 may be provided in substantially the same shape as that of the support robot arms 30 or the cleaning robot arms 70 mentioned above. The camera 81 may capture an image of a surface of the blade 13 and may transmit the image so that defects of the surface of the blade 13 can be inspected. That is, the captured image may be transmitted to the remote control system via the wireless communication unit of the body 21, and the remote control system may detect defects of the blade 13 by interpreting information of the transmitted image.

Each first defect inspection unit 80 may inspect defects of the sides of the blade 13 while the camera 81 moves upward and downward in a state in which the camera 81 is spaced apart from the sides of the blade 13 due to the operation of the inspection robot arms 90. Also, the operation is performed together with the travelling operation of the body 21 so that inspection in all area of the sides of the blade 13 can be performed.

Meanwhile, in the first embodiment, each first defect inspection unit 80 has a shape in which the camera 81 is installed at the distal end of each of the inspection robot arms 90. However, embodiments of the present invention are not limited thereto, and an ultrasonic inspection unit instead of the camera 81 may be installed at the distal end of each inspection robot arm 90 so as to inspect defects of the surface of the blade 13. That is, each first defect inspection unit 80 may include an inspection unit implemented as at least one of the camera 81 and the ultrasonic inspection unit.

The second defect inspection unit 130 may be installed at the lower part of the body 21 so as to inspect defects of the blade leading edge 13a, as illustrated in FIG. 2. The second defect inspection unit 130 may also include an inspection unit implemented as at least one of the camera 81 and the ultrasonic inspection unit, like in the first defect inspection units 80. The second defect inspection unit 130 may inspect defects of the blade leading edge 13a when the body 21 travels. In this way, in the first embodiment, defects of both sides of the blade 13 can be inspected by the first defect inspection units 80, and defects of the blade leading edge 13a can be inspected by the second defect inspection unit 130 so that defect inspection can be performed in the whole outer side of the blade 13.

The deicing unit 100 that removes ice formed on the blade leading edge 13a includes a blower flow path 101, which is disposed in the body 21 and an outlet 102 of which faces the blade leading edge 13a, a blower fan 104 installed within the blower flow path 101 so as to blow air toward the outlet 102 of the blower flow path 101, a motor 105 that drives the blower fan 104, and a heater 106 installed within the blower flow path 101 so as to heat air of the blower flow path 101. An inlet 103 of the blower flow path 101 may be provided on a top surface or front surface of the body 21.

In the deicing unit 100, the blower fan 104 operates due to the operation of the motor 105 so that blowing of air is performed via the blower flow path 101. That is, air introduced into the inlet 103 of the blower flow path 101 is ejected via the blower flow path 101 to face the blade leading edge 13a. In this case, since the heater 106 inside the blower flow path 101 operates and heats the ejected air, high-temperature air is ejected via the outlet 102 of the blower flow path 101. Thus, ice formed on the blade leading edge 13a may be melted and removed due to the high-temperature air.

Next, an operation of the blade maintenance device 20 according to the first embodiment of the present invention and a method of using the same will be described.

When the blade maintenance device 20 is mounted on the blade 13 of the wind turbine 10, the support robot arms 30 may operate, and the body 21 may be put on the blade 13 in a state in which the support robot arms 30 are gaped toward both sides of the body 21. After the body 21 is put on the blade 13, the support robot arms 30 operate and are supported on both sides of the blade 13. The operation may be performed in such a way that a worker mounts the blade maintenance device 20 on the blade 13 and manipulates the blade maintenance device 20 or controls the blade maintenance device 20 using a remote control unit. Also, the blade maintenance device 20 may be carried by the worker and may be mounted on the blade 13 or may be mounted on the blade 13 using additional mounting equipment, such as a hoist or crane.

After the blade maintenance device 20 is mounted on the blade 13, the worker may instruct an operation of the blade maintenance device 20 using a manipulation unit of the blade maintenance device 20 or may operate the blade maintenance device 20 by controlling the operation of the blade maintenance device 20 using the remote control unit. In this case, a cleaning operation, an inspection operation, and a deicing operation can be simultaneously performed, or one or a plurality of operations among the cleaning operation, the inspection operation, and the deicing operation may be selected and performed.

When the blade 13 is cleaned, the first cleaning unit 50 and the second cleaning unit 60 operate while the body 21 travels along the blade leading edge 13a. Due to the operation of the first cleaning unit 50, cleaning of the blade leading edge 13a can be performed, and due to the operation of the second cleaning unit 60, cleaning of both sides of the blade 13 can be performed. In this case, the first cleaning unit 50 performs cleaning of the blade leading edge 13a while moving together with the body 21, and the second cleaning unit 60 performs cleaning while moving upward and downward due to the cleaning robot arms 70 and simultaneously moving to a lengthwise direction of the blade 13 together with the body 21 so that cleaning can be performed in the whole outer side of the blade 13. Also, in this case, since the roller 34 installed at each support robot arm 30 contacts the sides of the blade 13 and is supported thereon, the blade maintenance device 20 can travel along the blade 13 stably.

A blade inspection operation can be performed together with or separately from the cleaning operation. The blade inspection operation can be performed in such a way that, while the body 21 travels along the blade leading edge 13a, each first defect inspection unit 80 moves upward and downward due to the operation of the inspection robot arms 90 and can inspect defects of both sides of the blade 13. Also, the second defect inspection unit 130 can inspect defects of the blade leading edge 13a. Thus, if each first defect inspection unit 80 and the second defect inspection unit 130 operate together, defects of the whole outer side of the blade 13 can be inspected.

A deicing operation can also be performed together with or separately from the cleaning operation and the blade inspection operation. The deicing operation is performed in such a way that, while the body 21 travels along the blade leading edge 13a, the deicing unit 100 operates and blows high-temperature air toward the blade leading edge 13a. Thus, ice formed on the blade leading edge 13a can be sequentially melted and removed as the body 21 travels gradually.

FIGS. 7 through 13 illustrate a blade maintenance device according to a second embodiment of the present invention.

Figure 7:
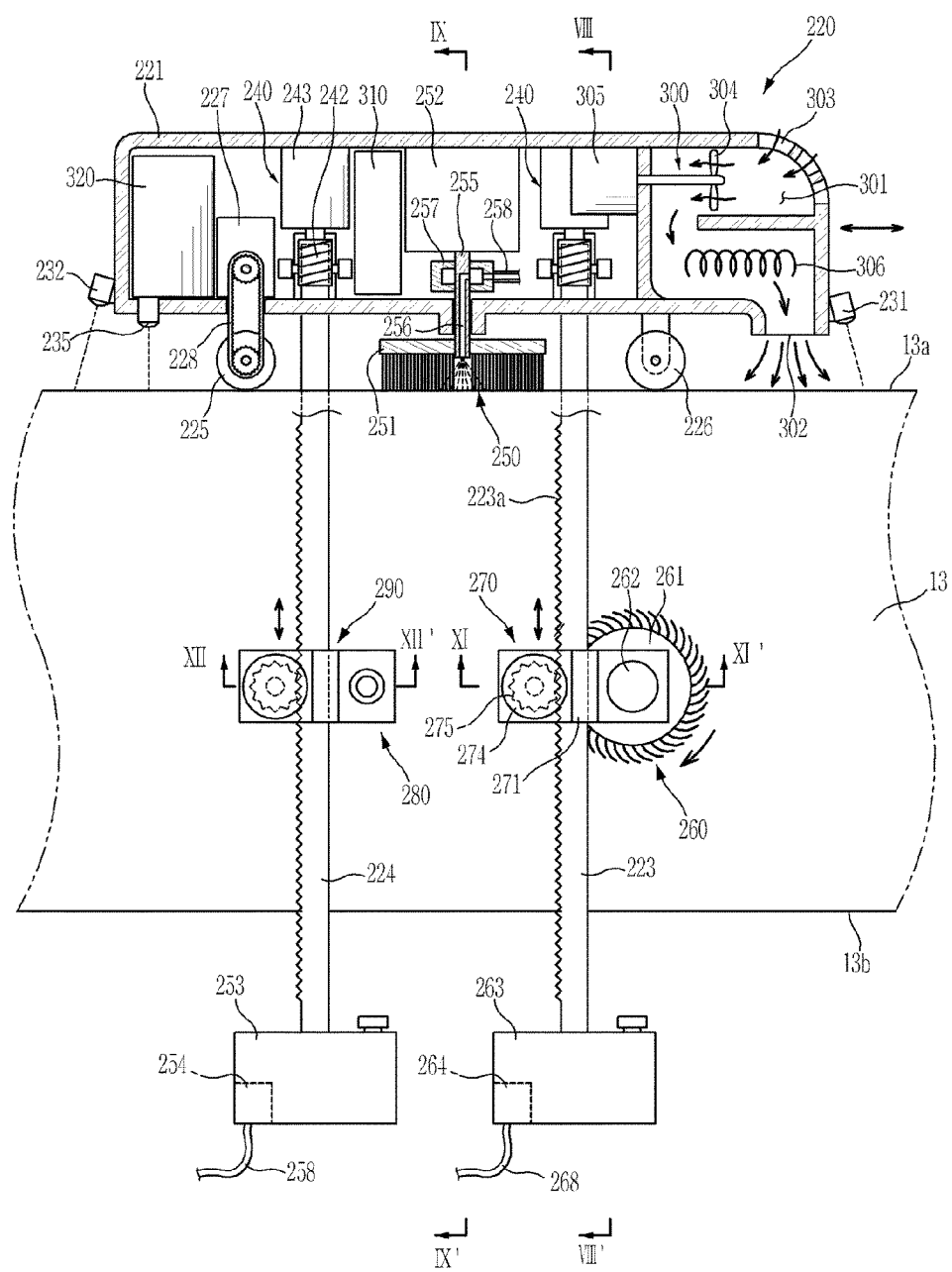
FIG. 7 is a cross-sectional view of a blade maintenance device mounted on a wind turbine blade, according to a second embodiment of the present invention.
Figure 8:
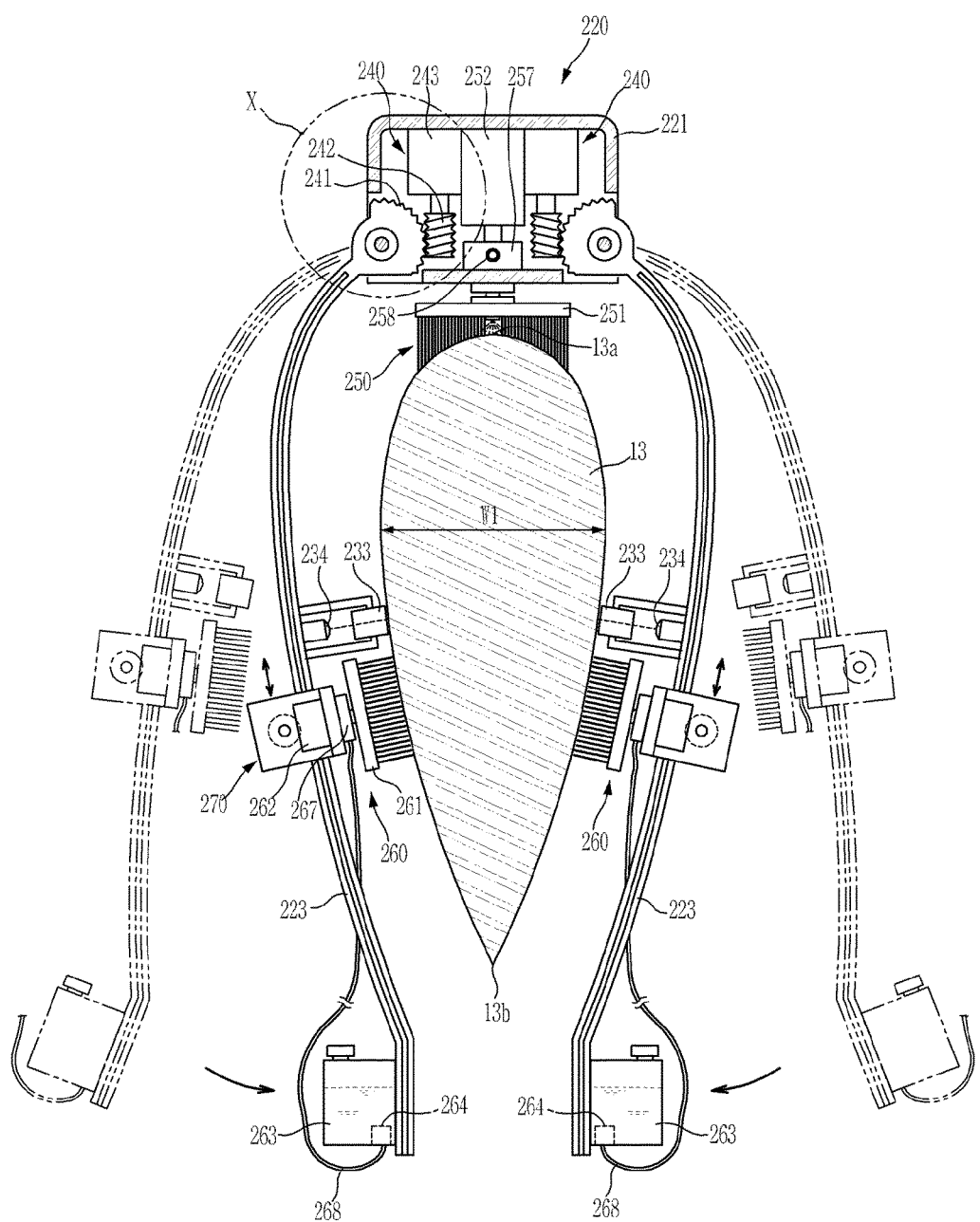
FIG. 8 is a cross-sectional view taken along line VIII-VIII' of FIG. 7.

As illustrated in FIGS. 7 and 8, a blade maintenance device 220 according to the second embodiment of the present invention includes a body 221 that travels along a blade leading edge 13a of a blade 13, and a plurality of support members 223 and 224 that support the body 221, extend from both sides of the body 221 to both sides of the blade 13, and support sides of the blade 13.

The body 221 includes a plurality of wheels 225 and 226 that may travel along the blade leading edge 13a of the blade 13, a driving motor 227 that drives one of the plurality of wheels 225 and 226, and a connection unit 228 that connects the driving motor 227 and the wheel 225, such as a belt or chain, like in the first embodiment. Also, the body 221 includes a first sensor 231 that is installed in front of the body 221 and detects a position of a free end of the blade 13, and a second sensor 232 that is installed in rear of the body 221 and detects a position of an end toward a hub of the blade 13. Thus, the body 221 can recognize positions of both ends of the blade 13 using the first and second sensors 231 and 232 when the body 221 travels along the blade leading edge 13a of the blade 13.

Figure 9:
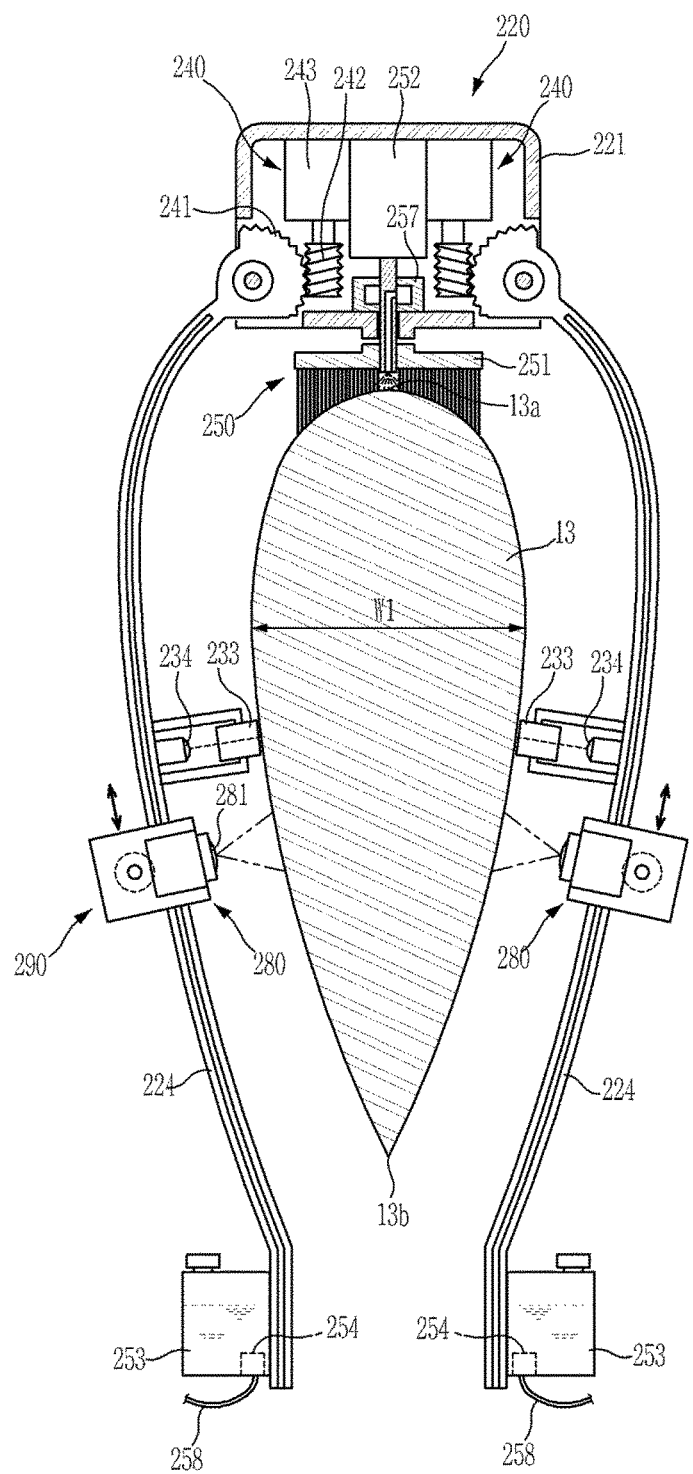
FIG. 9 is a cross-sectional view taken along line IX-IX' of FIG. 7.

The plurality of support members 223 and 224 may extend long downward in a state in which top ends of the support members 223 and 224 are rotatably coupled to both sides of the body 221, as illustrated in FIGS. 7 through 9. Each of the support members 223 and 224 may have a length that is larger than a maximum width of the blade 13, may be bent along each of curved surfaces of both sides of the blade 13, and may be formed of a material that can be elastically deformed. Also, each of the support members 223 and 224 includes a roller 233 that contacts an outer side of the blade 13 and makes a rolling movement so as to move together with the body 221 while maintaining a state in which the support members 223 and 224 are properly spaced apart from the sides of the blade 13.

The support members 223 and 224 may support the body 221 so that the body 221 can be stably travelled, and may serve as rails that guide movement of a maintenance unit. Also, the support members 223 and 224 have predetermined elasticity and thus may pressurize both sides of the blade 13. Thus, the body 221 can be stably supported.

The roller 233 installed at each of the support members 223 and 224 may be disposed in a position in which the roller 233 is inclined toward a maximum thickness W1 of the blade 13 or toward a trailing edge 13b of the blade 13 from the maximum thickness W1 of the blade 13, as illustrated in FIGS. 8 and 9. This is because, even when an external force, such as wind, applies to the roller 233, the support members 223 and 224 do not deviate from the blade 13 and support the body 221 stably.

In the second embodiment, each of the support members 223 and 224 is supported by the roller 233. However, support structures of the support members 223 and 224 are not limited thereto. The support members 223 and 224 may also be supported by support parts having other shapes that directly contact the sides of the blade 13 and slide, instead of the rollers 233. Also, like in FIG. 8, when the maintenance unit, such as a second cleaning unit 260 that will be described below, is installed at the support member 223, the maintenance unit can be supported on the sides of the blade 13 and can replace the roller 233 described above. Thus, the configuration of the roller 233 is not necessarily required. That is, stable travelling can be performed without the configuration of the roller 233.

A plurality of support member driving units 240 that rotate the support members 223 and 224 to be spaced apart from the sides of the blade 13 or to be close to the sides of the blade 13 may be installed at both sides of the body 221, as illustrated in FIGS. 8 and 9.

Figure 10:
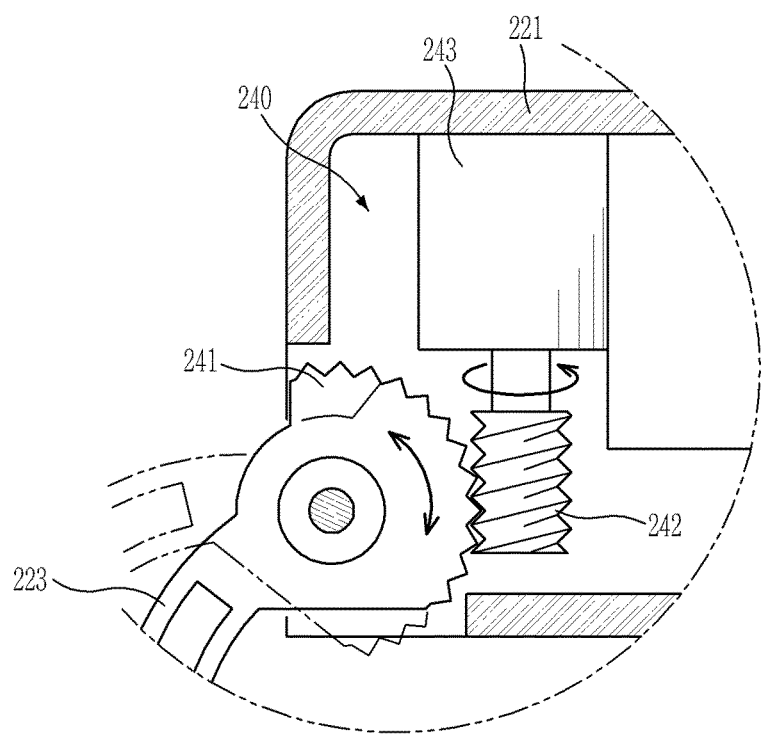
FIG. 10 is a detailed view of an X-portion of FIG. 8.

Each of the plurality of support member driving units 240 includes a gear part 241 connected to a top end of the support member 223, a worm wheel 242 engaged with the gear part 241, and a motor 243 that rotates the worm wheel 242 in forward and reverse directions, as illustrated in FIG. 10. The motor 243 rotates the worm wheel 242, and the worm wheel 242 rotates the gear part 241. Thus, the support member 223 may be close to or spaced apart from the sides of the blade 13. Each support member driving unit 240 that drives each of the support members 223 and 224 may have the same shape.

In the second embodiment, the motor 243, the worm wheel 242, and the gear part 241 are employed as an example of the support member driving units 240. However, embodiments of the present invention are not limited thereto, and a hydraulic cylinder that rotates the support members 223 and 224 or a deceleration gear type motor that directly rotates a shaft of a support member may be used as the support member driving units 240.

The support member driving units 240 may rotate the support members 223 and 224 and may cause both support members 223 and 224 to be spaced apart from the blade 13 when the blade maintenance device 220 is mounted on the blade 13, as illustrated in FIG. 8. Also, when the blade maintenance device 220 travels along the blade 13, both support member rollers 233 may be maintained in contact with the outer side of the blade 13 even when the thickness of the blade 13 varies. For this operation, a sensor 234 that is close to the roller 233 and detects a separation distance between each of the support members 223 and 224 and the sides of the blade 13 may be installed at each of the support members 223 and 224, as illustrated in FIG. 8. This is to control an operation of the support member driving units 240 through detection of the sensor 234.

In the second embodiment, as illustrated in FIG. 7, two support members are installed at both sides of the body 221 and are spaced apart from each other. However, the installation shape and the number of the support members are not limited thereto. One support member may be simply installed at each of both sides of the body 221 so that the body 221 can be stably travelled, and three or more support members may also be installed.

Meanwhile, in the second embodiment, the support members 223 and 224 can be rotated by employing the support member driving units 240, as mentioned above, so that the blade maintenance device 220 can be easily mounted on the blade 13, and even when the thickness of the blade 13 varies while the body 221 travels, the roller 233 is maintained in contact with the outer side of the blade 13. However, the support members 223 and 224 may be manufactured using a high-elasticity material having a large degree of deformation, such as spring steel, and when top ends of the support members 223 and 224 are fixed to the body 221, the support member driving units 240 may be excluded.

If each of the support members 223 and 224 is formed of a high-elasticity material, although there are no support member driving units 240, the blade maintenance device 220 can be easily mounted on the blade 13 by deformation of the support members 223 and 224. Also, even when the thickness of the blade 13 varies while the body 221 travels, contact between the roller 233 and the sides of the blade 13 can be maintained by elastic deformation of the support members 223 and 224.

As another method of excluding the support member driving units 240, a torsion spring may also be installed at a rotation connection unit in a state in which the top ends of the support members 223 and 224 are rotatably connected to the body 221. In this case, the torsion spring applies a force for rotating the support members 223 and 224 and causing the support members 223 and 224 to be close to the sides of the blade 13, such that, even when the thickness of the blade 13 varies while the body 221 travels, the roller 233 may be maintained in contact with the sides of the blade 13. Also, the support members 223 and 224 are rotated to be spaced from the sides of the blade 13 so that the blade maintenance device 220 can be easily mounted on the blade 13.

Also, the blade maintenance device 220 in the second embodiment includes a maintenance unit having various shapes for maintenance of the blade 13. As illustrated in FIG. 7, the maintenance unit may include a first cleaning unit 250 for cleaning the blade leading edge 13a of the blade 13, a second cleaning unit 260 for cleaning both sides of the blade 13, first defect inspection units 280 and a second defect inspection unit 235 for inspecting defects of the blade 13, and a deicing unit 300 for removing ice formed on the blade leading edge 13a.

In addition, the blade maintenance device 220 according to the second embodiment includes a controller 310 installed within the body 221 so that the blade maintenance device 220 can be travelled and an operation of the blade maintenance device 220 can be controlled, and a battery unit 320 installed within the body 221 so as to supply voltages for the operation of the blade maintenance device 220. Also, although not shown, a wireless communication unit that may communicate with a remote control system so as to remotely control the blade maintenance device 220, and a manipulation unit through which a user himself/herself may input information regarding an operation of the blade maintenance device 220 may be disposed on the body 221.

Figure 13:
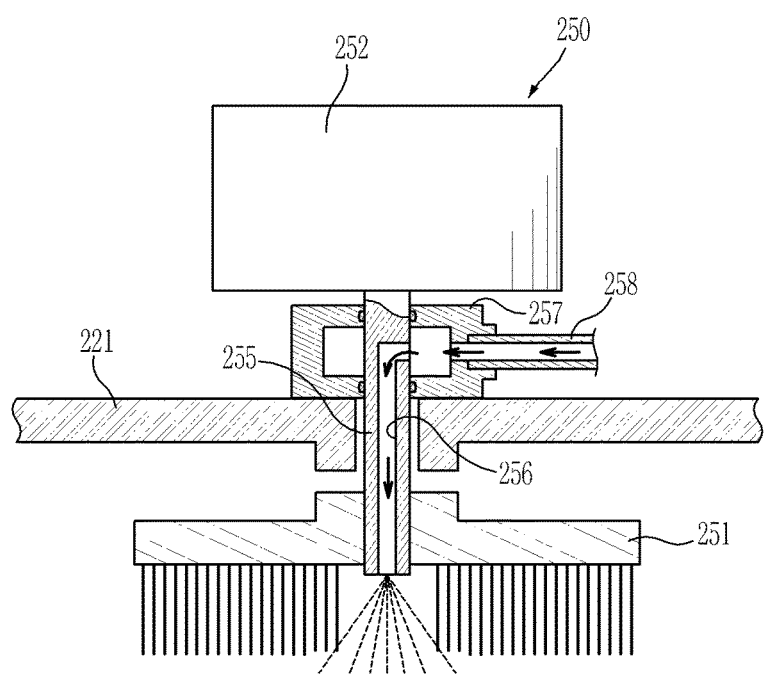
FIG. 13 is a detailed view of a first cleaning unit of the blade maintenance device according to the second embodiment of the present invention.

The first cleaning unit 250 includes a first cleaning brush 251 that is rotatably installed at a lower part of the body 221, a motor 252 installed in the body 221 so as to drive the first cleaning brush 251, a cleaning solution tank 253 installed at a bottom end of the support member 224, and a cleaning solution supply unit 254 installed within the cleaning solution tank 253 so as to supply a cleaning solution of the cleaning solution tank 253 to the first cleaning brush 251, as illustrated in FIGS. 7, 8, and 13.

As illustrated in FIG. 13, a cleaning solution supply flow path 256 is formed on a rotation shaft 255 of the motor 252 to which the first cleaning brush 251 is coupled, so as to supply the cleaning solution to a center of the first cleaning brush 251. A ring-shaped cleaning solution guide member 257 is installed at an outer side of the rotation shaft 255 inside the body 221 and surrounds an inlet of the cleaning solution supply flow path 256 so as to guide the cleaning solution toward the rotating cleaning solution supply flow path 256. A cleaning solution supply pipe 258 connected to the cleaning solution tank 253 is connected to the cleaning solution guide member 257. The cleaning solution supply unit 254 inside the cleaning solution tank 253 may be configured as a conventional fluid forced sending pump.

The first cleaning unit 250 may perform cleaning of the blade leading edge 13a by supplying the cleaning solution to the center of the first cleaning brush 251 while the first cleaning brush 251 is rotated due to an operation of the motor 252. Of course, since the operation is performed while the body 221 travels along the blade 13, cleaning may be performed in all areas of the blade leading edge 13a.

Figure 11:
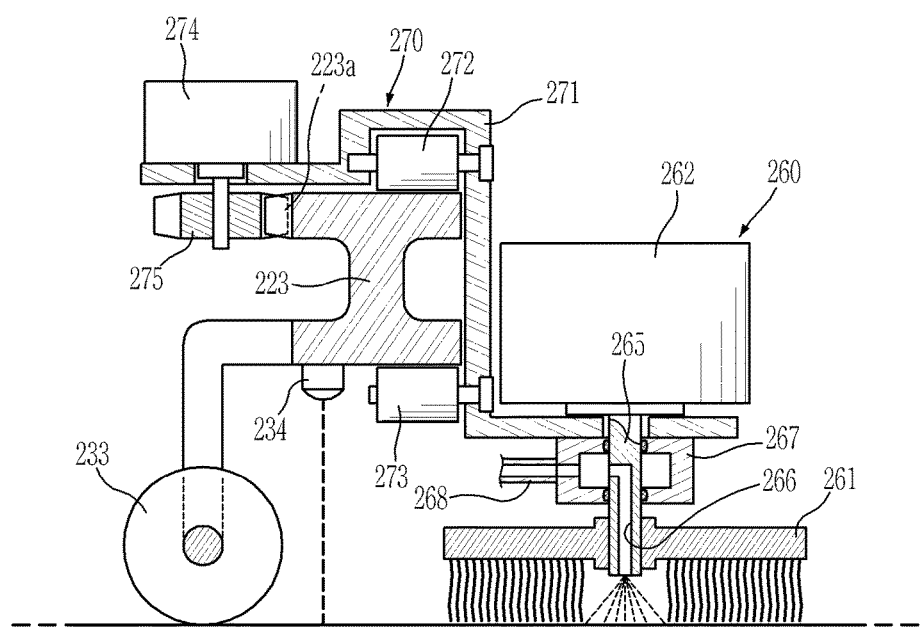
FIG. 11 is a cross-sectional view taken along line XI-XI' of FIG. 7.

The second cleaning unit 260 includes a movement unit 270 that moves along the support member 223, a second cleaning brush 261 installed at the movement unit 270 so as to be rotated in contact with the sides of the blade 13, a motor 262 installed at the movement unit 270 so as to drive the second cleaning brush 261, a cleaning solution tank 263 installed at a bottom end of the support member 223, and a cleaning solution supply unit 264 installed in the cleaning solution tank 263 so as to supply a cleaning solution of the cleaning solution tank 263 to the second cleaning brush 261, as illustrated in FIGS. 7, 8, and 11.

The second cleaning unit 260 may include a cleaning solution supply flow path 266 provided on a rotation shaft 265, a cleaning solution guide member 267 installed at an outer side of the rotation shaft 265, and a cleaning solution supply pipe 268 that connects the cleaning solution tank 263 and the cleaning solution guide member 267, like in the first cleaning unit 250, as illustrated in FIG. 11, so that the cleaning solution in the cleaning solution tank 263 can be supplied to a center of the second cleaning brush 261.

The plurality of cleaning solution supply tanks 253 and 263 installed at bottom ends of the support members 223 and 224 may be connected to the first cleaning brush 251 of the first cleaning unit 250 or the second cleaning brush 261 of the second cleaning unit 260 through additional flow paths. Alternatively, a valve-shaped cleaning solution distribution unit (not shown) having a plurality of distribution pipes may be installed at the body 221 so as to distribute the cleaning solution such that the cleaning solution in each of the cleaning solution tanks 253 and 263 can be shared by the first and second cleaning units 250 and 260.

In the second embodiment, the center of gravity may be placed at a lower part of the blade 13 so that the blade maintenance device 220 can be stably travelled and each of the cleaning solution tanks 253 and 263 is installed at a bottom end of each of the support members 223 and 224.

However, installation positions of the cleaning solution tanks 253 and 263 are not limited thereto. The cleaning solution tanks 253 and 263 may also be installed at the body 221.

The movement unit 270 that moves the second cleaning unit 260 includes a movement member 271 that is supported on an outer side of the support member 223 by a plurality of rollers 272 and 273 so that the movement member 271 can move upward and downward along the support member 223, a movement motor 274 installed at the movement member 271, and a driving body 275 that is coupled to a shaft of the movement motor 274 in contact with the outer side of the support member 223, as illustrated in FIG. 11. The driving body 275 may be configured as an external gear, and the support member 223 may include a straight gear part 223a that is long disposed in a lengthwise direction of the support member 223 so as to engage with the driving body 275, as illustrated in FIG. 7.

The movement unit 270 moves along the straight gear part 223a of the support member 223 while the driving body 275 configured as the external gear rotates due to an operation of the movement motor 274 so that the movement member 271 moves upward and downward along the support member 223. Thus, the second cleaning unit 260 may move upward and downward along the support member 223 and may perform cleaning of the sides of the blade 13. Since the cleaning operation is performed together with the operation of the body 221 that travels in the lengthwise direction of the blade 13, cleaning can be performed in all areas of the sides of the blade 13. If the first cleaning unit 250 and the second cleaning unit 260 operate together while the body 221 travels, cleaning can be performed in all areas of the outer side of the blade 13.

Meanwhile, the movement unit 270 of the second cleaning unit 260 includes the driving body 275 configured as an external gear. However, the shape of the driving body 275 is not limited thereto. The driving body 275 may have a shape of a roller having a frictional force, i.e., a shape in which the roller makes a rolling movement and moves in contact with an outer side of the support member 223. Also, the movement motor 274 may have a shape in which one of the rollers 272 and 273 that support the movement member 271 is directly rotated. The movement member 271 may also be installed to have a shape in which the movement member 271 slides along the support member 223 without the plurality of rollers 272 and 273.

Figure 12:
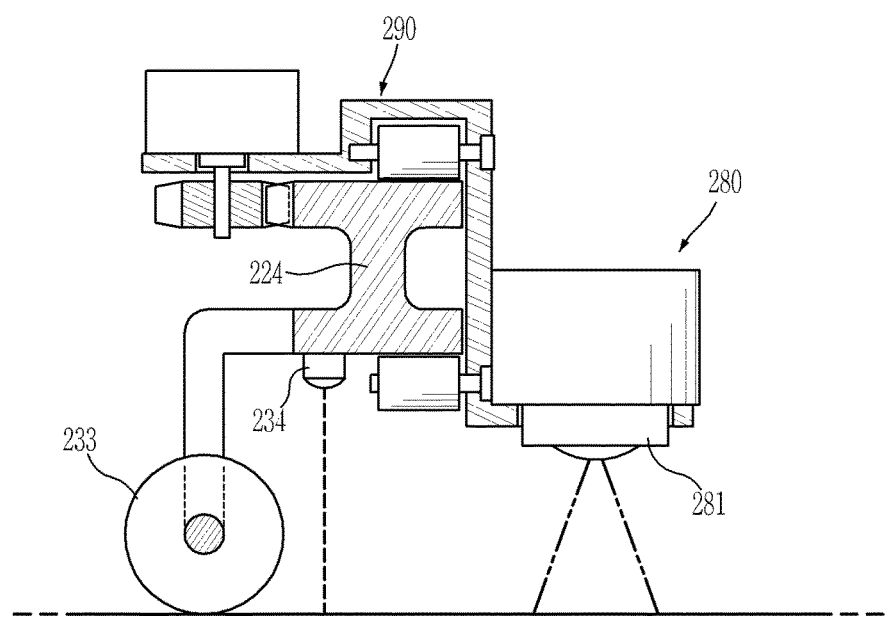
FIG. 12 is a cross-sectional view taken along line XII-XII' of FIG. 7.

Each of the first defect inspection units 280 may be installed at another support member 224 in which no second cleaning unit 260 is installed, as illustrated in FIG. 7. Each first defect inspection unit 280 may include a movement unit 290 that moves along the support member 224, and a camera 281 installed at the movement unit 290 so as to inspect defects of the sides of the blade 13, as illustrated in FIGS. 7, 9, and 12.

The movement unit 290 of each first defect inspection unit 280 may be provided substantially the same as the movement unit 270 of the second cleaning unit 260 mentioned above and thus, description thereof will be omitted. The camera 281 installed at the movement unit 290 captures an image of a surface of the blade 13 and transmits the image so that defects of the surface of the blade 13 can be inspected. That is, the captured image may be transmitted to the remote control system via the wireless communication unit of the body 221, and the remote control system may detect defects of the blade 13 by interpreting information of the transmitted image.

Each first defect inspection unit 280 may move upward and downward along the support member 224 and may inspect defects of the sides of the blade 13. Since the operation is performed together with the operation of the body 221 that travels in the lengthwise direction of the blade 13, inspection in all areas of the sides of the blade 13 can be performed.

Meanwhile, in the second embodiment, although the camera 281 is employed in each first defect inspection unit 280, each first defect inspection unit 280 may use a method of inspecting defects of the surface of the blade 13 by installing an ultrasonic inspection unit instead of a camera. That is, each first defect inspection unit 280 may include an inspection unit implemented as one of the camera and the ultrasonic inspection unit. Also, in the second embodiment, as illustrated in FIG. 7, the second cleaning unit 260 is disposed in front of the blade maintenance device 220 (right side of FIG. 7) based on a direction in which the body 221 mainly travels for cleaning, so that cleaning of the outer side of the blade 13 can be first performed and then defect inspection can be performed, and each first defect inspection unit 280 is disposed in rear of the second cleaning unit 260 (left side of FIG. 7) so as to follow the second cleaning unit 260. However, since the body 221 may make a forward/backward movement, positions of the second cleaning unit 260 and each first defect inspection unit 280 may be reversed. Also, FIG. 7 illustrates a case that the second cleaning unit 260 and each first defect inspection unit 280 are installed respectively at separate support members 223 and 224. However, the second cleaning unit 260 and each first defect inspection nit 280 may be disposed as one set and may move along one support member. For example, an inspection unit, such as the camera 281 or the ultrasonic inspection unit, may be installed at the movement unit 270 of the second cleaning unit 260 so that surface defects can be inspected together with cleaning. In this case, since the defect inspection operation and the cleaning operation need not to be interfered with each other, each first defect inspection unit 280 and the second cleaning unit 260 need to be spaced apart from each other.

The second defect inspection unit 235 may be installed at a lower part of the body 221, as illustrated in FIG. 7. The second defect inspection unit 235 may be implemented as an inspection unit, such as a camera or an ultrasonic inspection unit, like in the first defect inspection units 280. That is, the second defect inspection unit 235 may include an inspection unit implemented as at least one of the camera and the ultrasonic inspection unit. The second defect inspection unit 235 may inspect defects of the blade leading edge 13a when the body 221 travels.

In this way, in the second embodiment, defects of both sides of the blade 13 can be inspected by the first defect inspection units 280, and defects of the blade leading edge 13a can be inspected by the second defect inspection unit 235 so that defect inspection can be performed in all areas of the outer side of the blade 13.

As illustrated in FIG. 7, the deicing unit 300 includes a blower flow path 301, which is disposed in the body 221 and an outlet 302 of which faces the blade leading edge 13a, a blower fan 304 installed within the blower flow path 301 so as to blow air toward the outlet 302 of the blower flow path 301, a motor 305 that drives the blower fan 304, and a heater 306 installed within the blower flow path 301 so as to heat air of the blower flow path 301.

In the deicing unit 300, the blower fan 304 operates due to an operation of the motor 350 so that blowing of air is performed via the blower flow path 301. That is, air introduced into an inlet 303 of the blower flow path 301 is ejected via the blower flow path 301 to face the blade leading edge 13a. In this case, since the heater 306 inside the blower flow path 301 operates and heats the ejected air, high-temperature air is ejected via the outlet 302 of the blower flow path 301. Thus, ice formed on the blade leading edge 13a may be melted and removed due to the high-temperature air.

Next, an operation of the blade maintenance device 220 according to the second embodiment of the present invention and a method of using the same will be described.

When the blade maintenance device 220 is mounted on the blade 13 of the wind turbine 10, the support member driving unit 240 may operate, and the body 221 may be put on the blade 13 in a state in which the support members 223 and 224 are gaped toward both sides of the body 221, as illustrated in FIGS. 8 and 9. After the body 221 is put on the blade 13, the support members 223 and 224 operate again and are supported on both sides of the blade 13. The operation may be performed when a worker mounts the blade maintenance device 220 on the blade 13 and manipulates the blade maintenance device 220 or controls the blade maintenance device 220 using a remote control unit. Also, the blade maintenance device 220 may be carried by the worker and may be mounted on the blade 13 or may be mounted on the blade 13 using additional mounting equipment, such as a hoist, a crane, or a robot arm.

When the blade 13 is cleaned, the first cleaning unit 250 and the second cleaning unit 260 operate while the body 221 travels along the blade leading edge 13a. Due to the operation of the first cleaning unit 250, cleaning of the blade leading edge 13a can be performed, and due to the operation of the second cleaning unit 260, cleaning of both sides of the blade 13 can be performed. In this case, the first cleaning unit 250 performs cleaning of the blade leading edge 13a while moving together with the body 221, and the second cleaning unit 260 performs cleaning while moving upward and downward along the support member 223 and simultaneously moving to a lengthwise direction of the blade 13 together with the body 221 so that cleaning can be performed in the whole outer side of the blade 13. Also, in this case, since the rollers 233 of the support members 223 and 224 contact the sides of the blade 13 and are supported thereon, the blade maintenance device 220 can travel along the blade 13 stably.

A blade inspection operation can be performed together with or separately from the cleaning operation. The blade inspection operation can be performed in such a way that, while the body 221 travels along the blade leading edge 13a, the first defect inspection units 280 move upward and downward along the support member 224 and defects of both sides of the blade 13 can be inspected. Also, the second defect inspection unit 235 can inspect defects of the blade leading edge 13a. Thus, if the first defect inspection units 280 and the second defect inspection unit 235 operate together, defects of the whole outer side of the blade 13 can be inspected.

A deicing operation can also be performed together with or separately from the cleaning operation and the blade inspection operation. The deicing operation is performed in such a way that, while the body 221 travels along the blade leading edge 13a, the deicing unit 300 operates and blows high-temperature air toward the blade leading edge 13a. Thus, ice formed on the blade leading edge 13a can be sequentially melted and removed as the body 221 travels gradually.

The invention claimed is:

1. A blade maintenance device for a wind turbine, the blade maintenance device comprising:
   a body that travels along a leading edge of a blade;
   support units comprising support members that extend from the body to both sides of the blade and support the sides of the blade; and
   a maintenance unit installed at at least one of the body and the support units so as to perform maintenance of an outer side of the blade,
   wherein the maintenance unit comprises a movement unit that moves along one of the support members, and
   wherein the movement unit comprises:
      a movement member that moves along one of the support members;
      a movement motor installed at the movement member; and
      a driving body coupled to a shaft of the movement motor in contact with an outer side of the support member.

2. The blade maintenance device of claim 1, wherein the body comprises:
   a plurality of wheels installed to contact the blade leading edge;
   a driving motor that drives at least one of the plurality of wheels;
   a controller for controlling operations of the driving motor and the maintenance unit; and
   a battery unit installed so as to supply voltages for an operation of the blade maintenance device.

3. The blade maintenance device of claim 1, wherein the maintenance unit comprises an inspection unit that is installed at the body so as to inspect defects of the blade leading edge and implemented as at least one of a camera and an ultrasonic inspection unit.

4. The blade maintenance device of claim 1, wherein the body comprises:
   a first sensor that detects a position of a free end of the blade; and
   a second sensor that detects a position of an end toward a hub of the blade.

5. The blade maintenance device of claim 1, wherein the support members each has a length that is larger than a maximum width of the blade, bent along each of curved surfaces of both sides of the blade, and formed of a material that is capable of being elastically deformed.

6. The blade maintenance device of claim 5, wherein the maintenance unit comprises:
   an inspection unit that is installed at the movement unit so as to inspect defects of the sides of the blade and implemented as at least one of a camera and an ultrasonic inspection unit.

7. The blade maintenance device of claim 1, wherein the driving body comprises an external gear, and
   each of the support members comprises a straight gear part that is long disposed in a lengthwise direction of one of the support members so as to engage with the external gear.

8. The blade maintenance device of claim 1, wherein each of the support members comprises a roller that contacts an outer side of the blade and makes a rolling movement.

9. The blade maintenance device of claim 8, wherein the roller is disposed in a position in which the roller is inclined toward a maximum thickness of the blade or toward a trailing edge of the blade from the maximum thickness of the blade.

10. The blade maintenance device of claim 1, further comprising a sensor that detects a separation distance between each of the support members and the sides of the blade.

11. The blade maintenance device of claim 1, wherein the support members are rotatably coupled to the body, and
the body comprises a plurality of support member driving units that rotate the support members to be spaced apart from the sides of the blade or to be close to the sides of the blade.

12. The blade maintenance device of claim 11, wherein each of the plurality of support member driving units comprises:
a gear part connected to each of the support members;
a worm wheel engaged with the gear part; and
a motor that rotates the worm wheel in forward and reverse directions.

13. The blade maintenance device of claim 1, wherein the maintenance unit comprises:
a cleaning brush that is rotatably installed at a lower part of the body so as to clean the blade leading edge;
a motor installed at the body so as to drive the cleaning brush;
a cleaning solution tank installed at at least one of the body and the support members; and
a cleaning solution supply unit that supplies a cleaning solution of the cleaning solution tank to the cleaning brush.

14. The blade maintenance device of claim 13, wherein the maintenance unit further comprises:
a cleaning solution supply flow path provided on a rotation shaft of the motor to which the cleaning brush is coupled, so as to supply the cleaning solution to a center of the cleaning brush,
a cleaning solution guide member that is installed at an outer side of the rotation shaft and surrounds an inlet of the cleaning solution supply flow path so as to guide the cleaning solution toward the rotating cleaning solution supply flow path; and
a cleaning solution supply pipe that guides the cleaning solution of the cleaning solution tank toward the cleaning solution guide member.

15. The blade maintenance device of claim 1, wherein the maintenance unit comprises a deicing unit for removing ice formed on the blade leading edge, and
the deicing unit comprises:
a blower flow path provided on the body and having an outlet facing the blade leading edge;
a blower fan installed within the blower flow path so as to blow air toward the outlet of the blower flow path;
a motor that drives the blower fan; and
a heater installed within the blower flow path so as to heat air of the blower flow path.

16. The blade maintenance device of claim 1, wherein the maintenance unit comprises:
a cleaning brush that is installed at the movement unit,
a motor installed at the movement unit so as to drive the cleaning brush,
a cleaning solution tank installed at at least one of the body and the support members; and
a cleaning solution supply unit that supplies a cleaning solution of the cleaning solution tank to the cleaning brush.

17. The blade maintenance device of claim 16, wherein the maintenance unit further comprises:
a cleaning solution supply flow path provided on a rotation shaft of the motor to which the cleaning brush is coupled, so as to supply the cleaning solution to a center of the cleaning brush;
a cleaning solution guide member that is installed at an outer side of the rotation shaft and surrounds an inlet of the cleaning solution supply flow path so as to guide the cleaning solution toward the rotating cleaning solution supply flow path; and
a cleaning solution supply pipe that guides the cleaning solution of the cleaning solution tank toward the cleaning solution guide member.

18. The blade maintenance device of claim 1, wherein the movement unit further comprises a plurality of rollers installed at the movement member so that the movement member is capable of moving along one of the support members.

* * * * *